United States Patent [19]

Kafka

[11] Patent Number: 5,035,080
[45] Date of Patent: Jul. 30, 1991

[54] ELEMENT FOR ABOVE-GROUND CULTIVATION

[75] Inventor: Bernard Kafka, Rantigny, France

[73] Assignee: Isover Saint-Gobain, Courbevoie, France

[21] Appl. No.: 547,245

[22] Filed: Jul. 3, 1990

[30] Foreign Application Priority Data

Jul. 3, 1989 [FR] France .................... 89 08866

[51] Int. Cl.⁵ ............................................. A01G 31/00
[52] U.S. Cl. ............................................. 47/59; 47/64
[58] Field of Search ............................ 47/59, 64, 63

[56] References Cited

U.S. PATENT DOCUMENTS 4,769,277  9/1988  Meunier ........................ 428/280
4,777,763 10/1988  Shannon ........................ 47/74

FOREIGN PATENT DOCUMENTS 0133083  4/1984  European Pat. Off. .
310501   8/1984  European Pat. Off. .

OTHER PUBLICATIONS

DE-A-1 635 620 (Reichhold-Albert-Chemie AG), pp. 1,5,6,11.

Primary Examiner—Henry E. Raduazo
Attorney, Agent, or Firm—Oblon, Spivak, McClelland, Maier & Neustadt

[57] ABSTRACT

The invention relates to techniques for above-ground cultivation, and, more precisely, cultivation elements designated with the name of "substrate".

The cultivation cubes according to the invention are comprised of mineral fibers that are interconnected and whose distribution is without preferred order, no matter what direction they are viewed from.

The substrates according to the invention promote better colonization of the material by the roots.

5 Claims, 1 Drawing Sheet

ELEMENT FOR ABOVE-GROUND CULTIVATION

BACKGROUND OF THE INVENTION

1. Field of the Invention

The invention relates to techniques for above-ground cultivation (i.e., soil-less cultivation). More precisely, the invention relates to techniques in which cultivation employs several successive growth stages of the plants, each stage leading to the utilization of a substrate which offer a greater volume than that of the preceding one, to allow satisfactory development of the root system of the plant.

2. Discussion of the Background

In intensive modes of above-ground cultivation, good management of the materials and of the available space results in a succession of stages corresponding to the use of specific substrates.

The most common method currently in use in above-ground cultivation in greenhouses thus has at least two successive stages. The first stage corresponds to the initial growth of the plants. Since this does not require much volume and demonstrates limited development of the root system, professionals prefer to use a substrate with limited volume for this stage. This makes it possible to multiply the number of plants cultivated on a limited space. This also makes it possible to minimize the volume of nutrient solution necessary to keep this substrate in a condition that is adequate for the development of the plants. In a second stage, the plant which have grown on these substrates with limited volume are arranged, together with the first substrate, on a second substrate which offers a greater volume, and are ordinarily spaced apart from one another.

SUMMARY OF THE INVENTION

The invention relates to mineral substrates on which plants which only require a limited volume, on the order of 1 square decimeter, are developed. More precisely, the invention relates to substrates of mineral fibers such as those which comprise glass wool or rock wool.

The substrates considered according to the invention have a shape that is generally a parallelepiped. This shape is the one that, from the point of view both of the producers and the users, is by far the most practical. Transport of these substrates, by avoiding any lost volume, is improved by this shape. Their production is also greatly facilitated and lends itself to high-speed automation. These advantages are very important for products which necessarily have to be sold at a very low price. For the use, the parallelepiped shape allows easy grouping of these elements on a reduced surface in the stages of cultivation during which it is advantageous to minimize the space used, since the plants are not very developed yet.

To make the presentation easier, we will designate substrate elements with the name of "cubes" in the following, with the understanding that they do not necessarily, or even generally, present a truly cubic shape. This name was chosen, however, because it is the one generally used by the users of the inventive material.

It is necessary, in order to have a good understanding of the problem which the invention proposes to resolve, to explain the cultivation conditions in these "cubes" in greater detail.

In the methods of intensive cultivation which represent the major markets for the type of products which the "cubes" represent, these are first arranged one up against the other, on a large surface. In this type of arrangement, it is necessary to provide satisfactory irrigation and, at the same time, suitable aeration to assure the most complete and rapid possible growth of the plants. The irrigation can be carried out either on the upper part of the cubes, or at their base, in other words the part which rests on the ground. These types of irrigation operations are carried out in a cycle which depends both on the type of cultivation in question and on the ambient conditions (season, temperature, evaporation, etc.). After a certain development of the plants, it is usual to separate the cubes from one another to offer more space and light. In this stage again, irrigation is advantageously carried out as indicated above, a method which is designated with the term of "subirrigation."

In these stages of cultivation in cubes, we have seen how irrigation can be carried out. Good aeration is a necessary condition for good development of the latter.

While aeration of the cubes depends on the irrigation conditions, it depends above all on the cubes themselves.

Devices have been proposed elsewhere to improve aeration of the cubes, by changing their shape, for example. In these prior devices, the basic aim is to prevent too large a contact surface between the cubes and the support on which they rest. The purpose is therefore essentially to promote "drainage" of the cube. In other words, starting with a material for which the water retention characteristics are known, what is involved is to change the shape of these cubes in such a way as to change the "usual" characteristics of these materials.

A difficulty encountered with prior cubes is not only to end up with a good air/water ratio, but also do work in such a way that this ratio is maintained for as long a time as possible between two batches of solution, if the solution is supplied in discontinuous manner. Furthermore, it is important to limit the differences which can exist between different levels in the height of the cube, to the greatest possible extent.

It has been proposed previously to use cubes in which the fibers are preferentially oriented in planes that are essentially vertical, in order to prevent the formation of a part at the base which is entirely saturated, for example. With the same packing comprising the base material, the distribution of the solution will be very different, depending on whether the fibers are in horizontal or vertical planes.

Furthermore, the use of cubes with vertical fibers will give the cubes a better mechanical hold, particularly better resistance to crushing. This property is particularly desirable if felts (mats) with a relatively low volume weight are used, which corresponds to thinner fibers, which offer less resistance to deformation under cultivation conditions.

DESCRIPTION OF THE INVENTION

However, experience has shown that the choice of materials in which the fibers are mainly in vertical planes is not fully satisfactory for the needs of horticulturists. It has been shown, in the course of study of these materials, that the mechanical strength and the air/water ratio, although they are very great, do not completely take the needs for plant growth into account. The inventors have been able to show that the distribution of the roots in the cultivation material is a very influential factor, and that this distribution needs to be improved.

While the growth of plants in cubes with "vertical" fibers is promoted by better drainage and therefore by the existence of a higher air/water ratio, the verticality of the fibers seems to limit the diffusion of the roots in the cube. In a simplified manner, the growth of the roots occurs preferentially from the top to the bottom in this type of cube, with limited transverse colonization. The reasons for this form of growth are not fully determined. We will attempt some hypotheses further on, looking at results for comparison examples compared with embodiments according to the invention.

The inventors have shown that for cultivation cubes made of mineral fibers, it was possible to improve the colonization of the material by the roots without thereby causing difficulty with regard to mechanical properties, by using a felt which has a structure different from that of the most usual felts.

In this regard, it is known that the mineral fiber substrates used in above-ground cultivation are products diverted from their original intended use, which is thermal insulation. In practice, the industrialists who had the idea of using these products in horticulture initially limited the modifications of the base product to the strict minimum, which was to make them wettable, while traditionally, hydrophobic properties are desirable for insulation. The method of production for the felt used for production of the substrates for above-ground cultivation is the same as that for insulation felts, for this reason; this applies particularly to the formation of the fibers and the subsequent stages which result in composition of a felt. It is well known that in the usual modes of production, the fibers collected on a conveyor that is gas permeable have a tendency to place themselves in parallel layers, in the plane of the conveyor on which they are deposited. This preferential orientation, which is inherent to the production techniques, is found in the final product. In the case of substrates which are said to have "vertical fibers," the structure of the base material remains unchanged. Only the position of the material in the substrate is modified. Instead of being used as a "horizontal" felt, the felt is used vertically, by rotating the material in the cultivation elements. Therefore, in this case, the layers which initially form parallel to the plane of the receiving conveyor are in a "vertical" position.

The inventors have shown that an improvement in the growth of the plants and better colonization of the material of the cubes could be obtained by using a material in which the fibers are not arranged preferentially in a stratified form, but, to the greatest extent possible, are oriented in a random manner in all directions.

Insulating materials with a mineral felt base which present this type of structure are known, for example, from the European Patent EP-B-0 133 083. The purpose pursued in this prior document is to constitute insulation felts which have a very good mechanical strength, particularly resistance to compression, and which are used, for example, in building terraces.

It has been shown that the felts which present a structure analogous to that of insulating fiber products of the state of the art cited promote an advantageous distribution of the root system in plant cultivation.

The method of obtaining the substrates according to the invention also determines their structure. This method is the one described in the European patent cited. According to this patent, what is involved is to assure a rearrangement of the orientation of the fibers, starting with a nonwoven fabric of fibers collected on a conveyor belt. The fabric formed on the conveyor has the layers as indicated above. The rearrangement is carried out by compressing the fabric in the longitudinal direction. This operation, which is also called creping, is carried out in continuous manner on the fabric, before the structure is fixed by cross-linking the binder.

The operation of creping, which corresponds to longitudinal compression, must not be confused with the compression exerted in the thickness of the fabric in almost all production methods for insulation packings. This latter process has the main purpose of fixing the thickness of the final product and its volume weight. Compression exerted perpendicular to the plane of the fiber layers does not result in any change in the stratification, only tightening of the layers.

This being said, it is self-evident that longitudinal compression which leads to creping of the fibers can be combined with a compression in the thickness of the fabric, and these operations can be simultaneous or consecutive.

The longitudinal compression can reach high proportions, which are a function of several factors: the dimensions of the fibers which comprise the fabric, the thickness and the volume weight of the fabric, etc. To obtain a significant rearrangement of the orientation of the fibers, the rate of longitudinal compression is greater than 1.5, and preferably greater than 2.

The term "rate of compression" in understood to be the ratio of the lengths before and after compression.

For fabrics which initially have a very low volume weight, and taking into account the volume weights used in materials for above-ground cultivation, the rate of compression can be as high as 10 and more. Usually, the rate will not exceed 6.

In preferred manner, the cubes according to the invention have a volume weight between 20 and 70 kg/m$^3$, and preferably between 30 and 60 kg/m$^3$.

Economic reasons make it desirable to use the lightest products. A gain in material costs and also in transport costs can be achieved. Furthermore, light products are also often those in which the fibers are the thinnest, and which therefore offer the highest rates of water retention relative to the weight of the fibers. However, lightness must not be allowed to compromise the strength of the cube in use. Even suitably creped, which improves the mechanical strength by changing the distribution of the fibers, the cube must preferably not be less than 20 kg/m$^3$. In this sector, cubes made of fiberglass, where the fibers can be long and thin in dimension, are among the products which can have the smallest volume weight. There is another reason why a minimum volume weight is preferable. It is suitable for these cubes to have a certain stability during their use. They are generally simply placed on the support which holds them. It must be prevented that the plant growing in the cube can tip it over. It is especially important that the cubes do not suffer any major deformations if compressed, and in particular, that they can be picked up, even when filled with solution, without deforming too much. It is important, in fact, that manipulations of the cubes, for example during thinning or placement on flats, does not cause then to come loose. A certain volume weight is therefore preferable.

The dimension of the fibers is another factor that influences the quality of the products. Previously, in making mineral substrates, the tendency was to use fibers which were among the thinnest that could be made. The purpose was to promote the capillarity of the products by increasing the ratio of fiber surface/fiber weight. Experience in cultivation shows that to promote growth of the root system in a homogeneous manner, and for the preferred volume weights as indicated above, it is advantageous to choose fibers with an average diameter between 2 and 9 micrometers, with a diameter between 4 and 7 being preferred. The micron ratio of these fibers is between 1 and 7 on 5 g.

BRIEF DESCRIPTION OF THE FIGURES

The invention is described in more detail, making reference to the figures, which show.

DETAILED DESCRIPTION OF THE PREFERRED EMBODIMENTS

Figure 1:
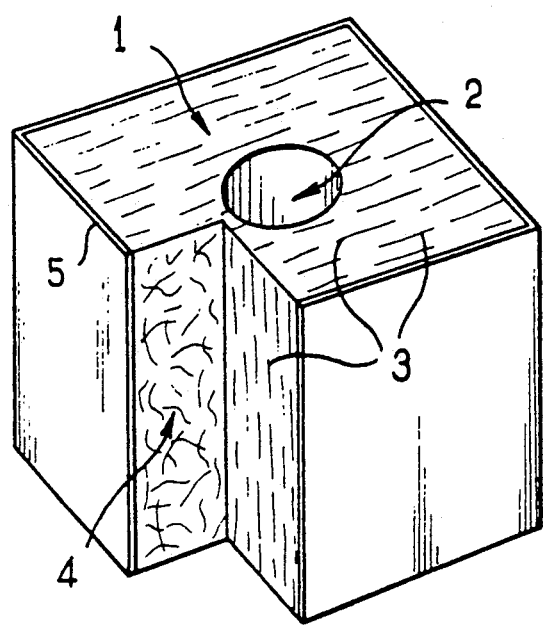
FIG. 1 represents a perspective view and a partial cross-section of a traditional cube.

FIG. 1 represents a traditional cube. This is ordinarily composed of a block of mineral wool (1) with dimensions on the order of about ten centimeters on a side.

Traditionally, the upper face of the cube has a recess (2) in which a "plug" (6) will be placed. This is the name for supports with small dimensions—a few centimeters—comprised of a material on which germination takes place at the start of cultivation. The step of growth of the plant by the use of a plug is not necessary. This stage is utilized by horticultural companies which work in very large volume. In this case, it allows a very significant gain in space for the first few days of cultivation. The plug is made of a material which can be the same as that of the cube, or different.

The structure of the cube is such that the layers (3) of the fiber material are arranged vertically. The arrangement is ordinarily visible, to the extent that light variations in coloration, related to the presence of a binder, cause "striae" on the upper face. The same "striae" are also visible on the lateral faces, to which the layers are perpendicular.

The distribution of the fibers in the "plane" of a layer appears completely random, in contrast. This is represented in the plane of the cross-section (4). It is understood that the same random arrangement is found on the two other lateral faces parallel to the layers, which are not shown on FIG. 1.

The cube is generally covered with a wrapper (5) held on the four lateral faces. This wrapper is ordinarily made of polyethylene or any other synthetic film with the same properties. The film of the wrapper is generally held on the cube by heat-shrinking. The role of the film is to limit evaporation of the cube, to prevent the roots from exiting on the lateral faces of the cube, and to prevent growth of algae on the cube. For this latter reason, the material of the wrapper is advantageously opaque for UV light.

Figure 2:
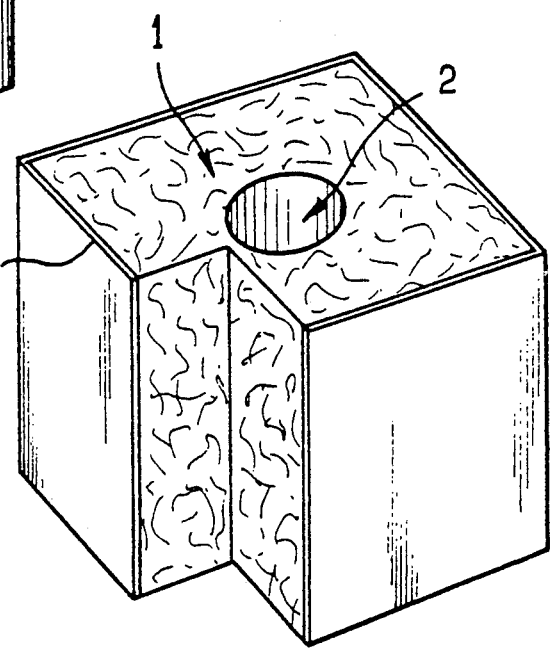
FIG. 2 is a view analogous to the preceding view, showing a cube according to the invention.

The same elements are shown in FIG. 2 for a cube produced of a material according to the invention. The difference in treatment, in other words the longitudinal compression of the packing or creping, breaks the traditional "stratification" of the fibers. If the compression is carried out in a satisfactory manner, following the indications stated above, the structure is practically identical in all directions. This is shown in FIG. 2, which shows fibers without preferred orientation, no matter what plane is viewed.

Figure 3:
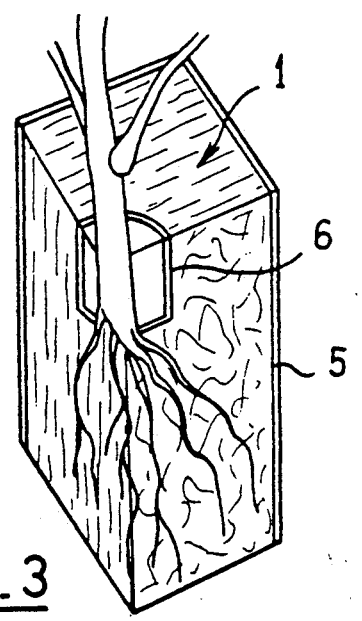
FIG. 3 shows a schematic view of the method of progression of the roots in a traditional cube.
Figure 4:
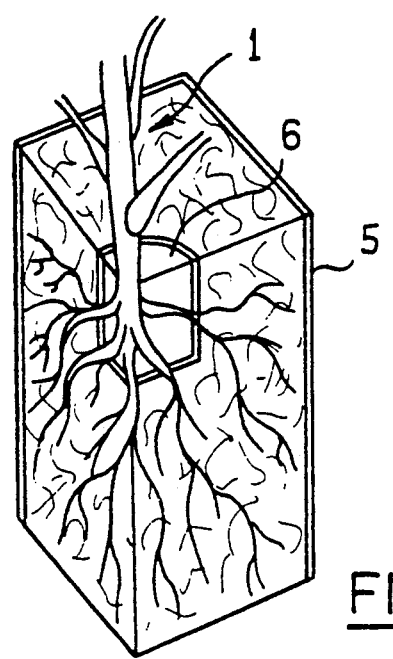
FIG. 4 shows a schematic view of the method of progression of the roots in a cube according to the invention.

One of the principal advantages of the use of the cubes according to the invention, as compared with traditional cubes, is illustrated in FIGS. 3 and 4. In these two figures, which each represent a quarter of a cube in cross-section, the typical modes of growth in each of the materials are shown in schematic manner.

In the traditional material of FIG. 3, the growth of the roots takes place to a greater extent between the layers. The roots seem to find it difficult to pass from one layer to the next, as if they encountered an obstacle to their forward movement. Growth in the planes parallel to the layers promotes a rapid progression of the roots towards the bottom layers of the cube or on the sides. Under these conditions, colonization of the cube by the roots is only partial.

In contrast, the growth of the sample according to the invention in FIG. 4 shows good diffusion of the roots in the entire material of the cube, in all directions. The cube is therefore better "utilized" for its functions of providing air and nutritive solution to the plant. Furthermore, for identical cultivation periods, plants growing on the products according to the invention are better developed.

In the prior embodiments, it was found that the effect of stratification which prevents penetration of the roots is all the more noticeable, the more the felt is composed of long and thin fibers which form a closer network. For this reason, the choice of cubes corresponding to the characteristics of the invention is particularly useful with glass fibers.

Comparison tests were conducted using tomato plants of the Capello variety.

Cultivation was carried out on cubes of glass fibers. This glass is one of those utilized for products intended for insulation. Its composition is:

| $SiO_2$ | 64.1% | $Na_2$ | 15.75% |
|---|---|---|---|
| $Al_2O_3$ | 3.4% | $K_2O$ | 1.15% |
| CaO | 7.2% | $B_2O_3$ | 4.5% |
| MgO | 3% | $Fe_2O_3$ | 0.45% |
| $SO_3$ | 0.25% | impurities | 0.2% |

The felts have a volume weight of 45 kg/m$^3$ and their micronaire ratio is 5 on 5 g (which corresponds to fibers with an average diameter of 6 micrometers).

In a first series of samples, the felt was kept stratified. No longitudinal compression was applied during its production.

In a second series of samples, the felt used is the result, after a nonwoven fabric is received on a conveyor, of one or more longitudinal compressions with a rate of 4.

The cubes have a size of 100×100×65 mm. In the "laminated" or stratified cube, the layers are vertical.

Cultivation was carried out as follows:

seeding at time=0 on plugs of glass wool, at 2 weeks, replanting of the plugs on cubes arranged side by side, at 5 weeks, separation of the cubes at a ration of 8/m$^2$ of ground, at 6 weeks, the plants are ready for transport of the cubes on cultivation flats.

Growth is stopped at this stage. The plants are cut at a level higher than the cube, and the fresh aboveground vegetable weight is measured, and the two series of samples are dried.

The average of 12 plants of each of the series shows the following:

sample on stratified cube:
fresh weight: 239 g
dried weight: 24.1 g sample on cube according to the invention:
fresh weight: 266 g
dried weight: 27.1 g The comparison shows a progression of approximately 10% of the above-ground vegetable weight in the case of the invention. This finding is supplemented by the observation of the growth of roots in the cross-section of the cubes. It is clearly evident on the cross-sections that more complete colonization occurs on the cubes according to the invention.

In the above, it was indicated that felts made of glass fibers are well suited for the intended use. Economic considerations are added to this result, which make these felts very advantageous in certain cases. In this sense, the origin of these products must be emphasized once again. We have seen that they were derived from the production of insulation packings. Taking into account the geographic distribution of production plants for insulation fiberglass, it is possible to produce the cultivation cubes according to the invention in the proximity of the utilization areas, and therefore to minimize costs for transport and storage.

What is claimed as new and desired to be secured by Letters Patent of the United States is:

1. A substrate for the growth of plants in the field of aboveground cultivation, comprised of a mineral fiber material, in which the fibers are interconnected by means of a binder, wherein the fibers of the material are randomly arranged without preferred order, from all said substrate formed by the steps of:
   collecting individual fibers having an adhesive applied thereto into a sheet of nonwoven fabric having fibers running in a substantially longitudinal direction,
   compressing the fabric in the longitudinal direction of the fibers to a density of 20–30 kg/m$^3$, and
   permitting said adhesive to set.

2. The substrate according to claim 1, in which the ratio of length before to after compression of the nonwoven fabric is between 1:1.5 and 1:10.

3. The substrate according to claim 1, comprised of glass fibers with an average diameter between 2 and 9 micrometers.

4. The substrate according to claim 1, comprised of glass fibers with an average diameter between 4 and 7 micrometers.

5. The substrate according to claim 1, comprised of glass fibers with a micronaire ratio between 1 and 7 on 5 g.

* * * * *